(12) United States Patent
Lehtiniemi et al.

(10) Patent No.: US 9,560,484 B2
(45) Date of Patent: Jan. 31, 2017

(54) PERFORMANCE OF A LOCATION RESPONSE ACTION

(71) Applicant: Nokia Technologies Oy, Espoo (FI)

(72) Inventors: Arto Lehtiniemi, Lempäälä (FI); Antti Eronen, Tampere (FI); Jussi Leppänen, Tampere (FI); Jukka Holm, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/664,319

(22) Filed: Mar. 20, 2015

(65) Prior Publication Data

US 2015/0281902 A1  Oct. 1, 2015

(30) Foreign Application Priority Data

Mar. 25, 2014  (EP) ..................................... 14161436

(51) Int. Cl.
| | |
|---|---|
| H04W 4/02 | (2009.01) |
| G06F 3/048 | (2013.01) |
| H04M 3/00 | (2006.01) |
| H04W 4/16 | (2009.01) |
| H04M 1/725 | (2006.01) |
| G01C 21/36 | (2006.01) |
| H04M 3/42 | (2006.01) |
| H04M 1/2745 | (2006.01) |

(52) U.S. Cl.
CPC .......... *H04W 4/023* (2013.01); *G01C 21/3682* (2013.01); *G06F 3/048* (2013.01); *H04M 1/72519* (2013.01); *H04M 1/72572* (2013.01); *H04M 3/00* (2013.01); *H04W 4/02* (2013.01); *H04W 4/16* (2013.01); *H04M 1/274575* (2013.01); *H04M 3/42093* (2013.01); *H04M 2250/60* (2013.01)

(58) Field of Classification Search
CPC .......... H04W 4/02; H04W 4/043; H04W 4/16; H04M 3/00
USPC ................ 455/414.1, 417, 456.1–456.3, 457
See application file for complete search history.

(56) References Cited

U.S. PATENT DOCUMENTS

| | | |
|---|---|---|
| 2010/0216432 A1 | 8/2010 | Wu |
| 2012/0214457 A1 | 8/2012 | Iaccarino |
| 2013/0324093 A1 | 12/2013 | Santamaria et al. |

FOREIGN PATENT DOCUMENTS

| | | |
|---|---|---|
| EP | 2081369 A1 | 7/2009 |
| EP | 2672687 A2 | 12/2013 |
| JP | H11306495 A | 11/1999 |
| JP | 2001-308984 A | 11/2001 |

(Continued)

OTHER PUBLICATIONS

Extended European Search Report received for corresponding European Patent Application No. 14161436.2, dated Nov. 4, 2014, 6 pages.

(Continued)

*Primary Examiner* — Sam Bhattacharya
(74) *Attorney, Agent, or Firm* — Alston & Bird LLP

(57) ABSTRACT

A method comprising receiving information indicative of an incoming communication, determining a notification that signifies the incoming communication, causing rendering of the notification, receiving information indicative of a point of interest selection input that identifies a selected point of interest, and causing performance of a location response action associated with the incoming communication, based at least in part, on the selected point of interest is disclosed.

12 Claims, 13 Drawing Sheets

(56) References Cited

FOREIGN PATENT DOCUMENTS

| | | |
|---|---|---|
| JP | 2002-156231 A | 5/2002 |
| JP | 2009-188725 A | 8/2009 |
| WO | 2013/029258 A1 | 3/2013 |

OTHER PUBLICATIONS

Office Action for corresponding European Application No. 14161436.2 dated Apr. 21, 2016, 4 pages.

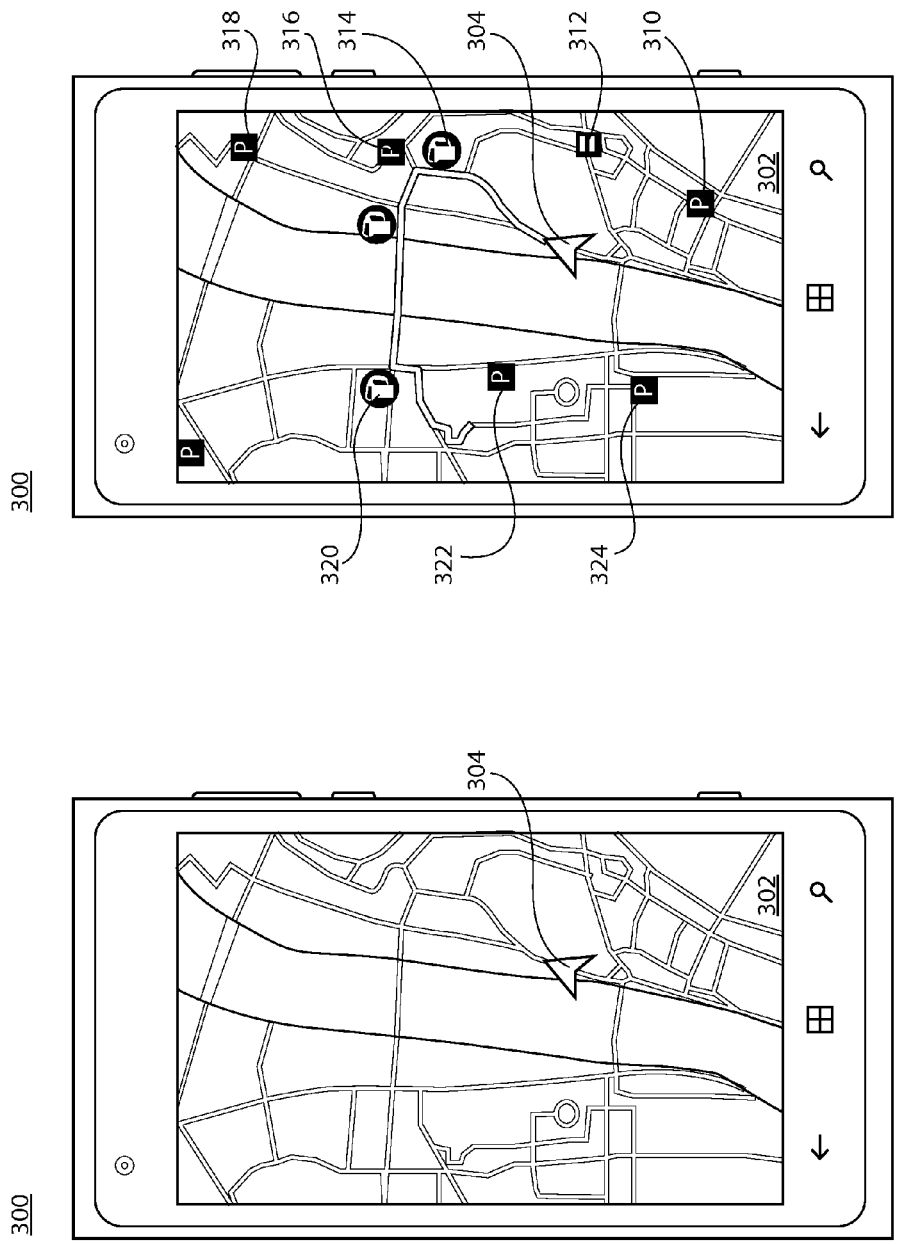

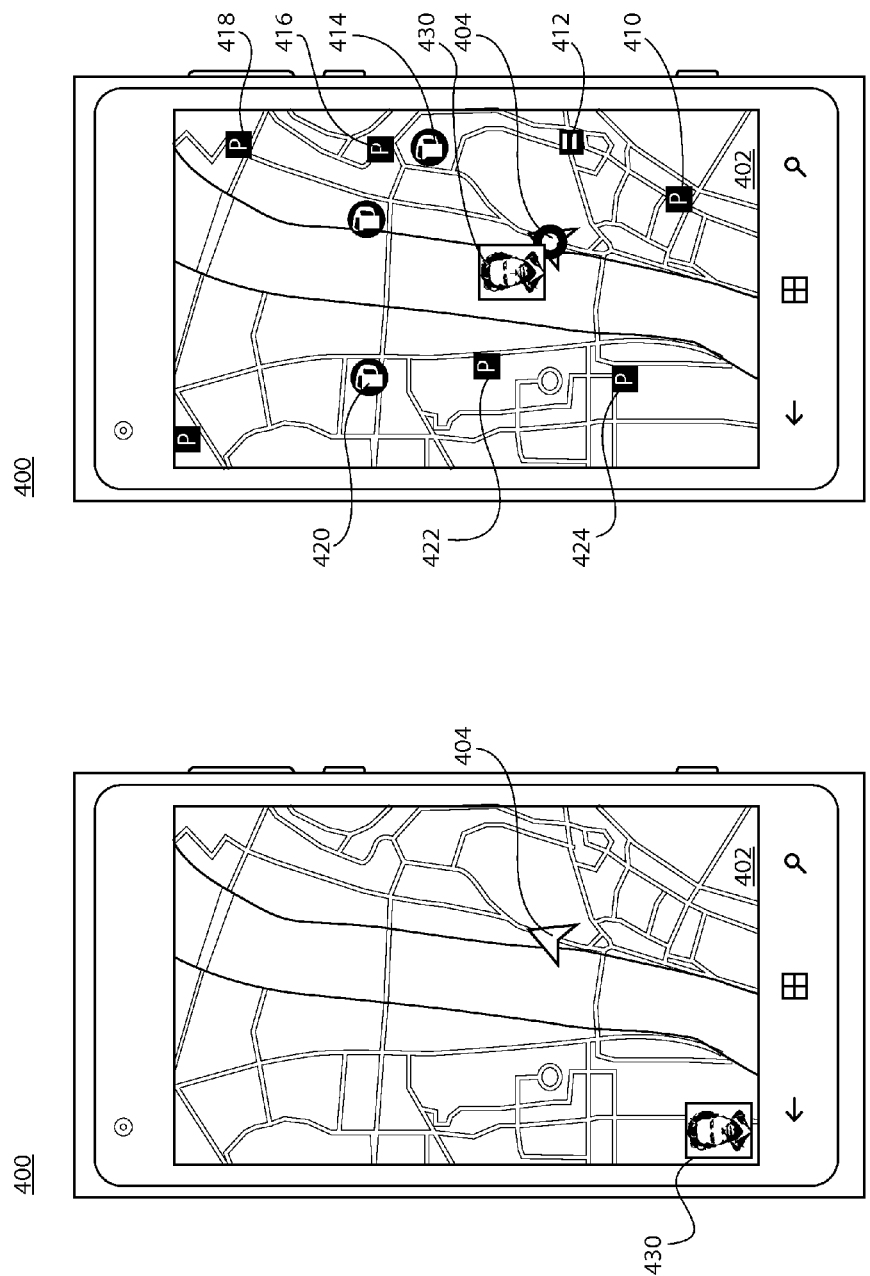

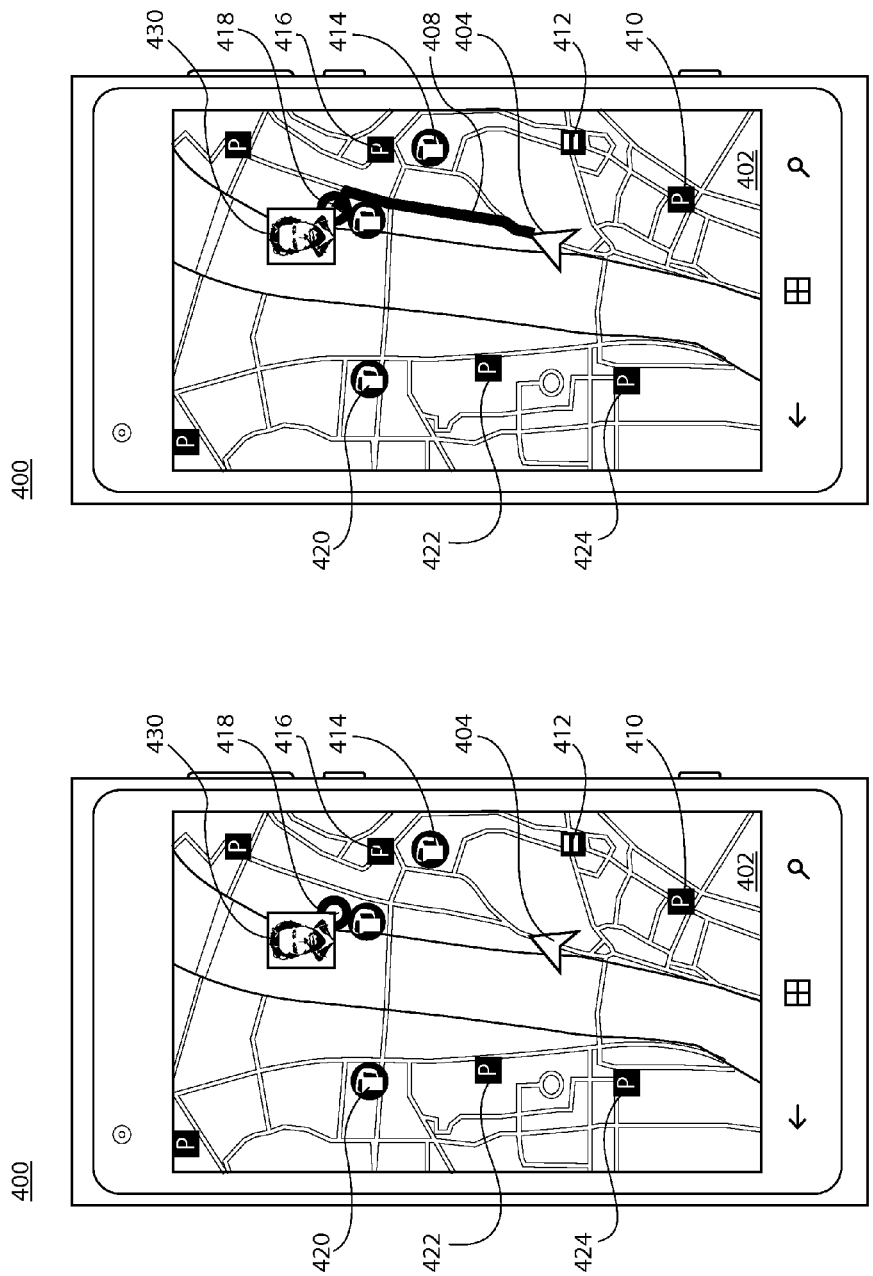

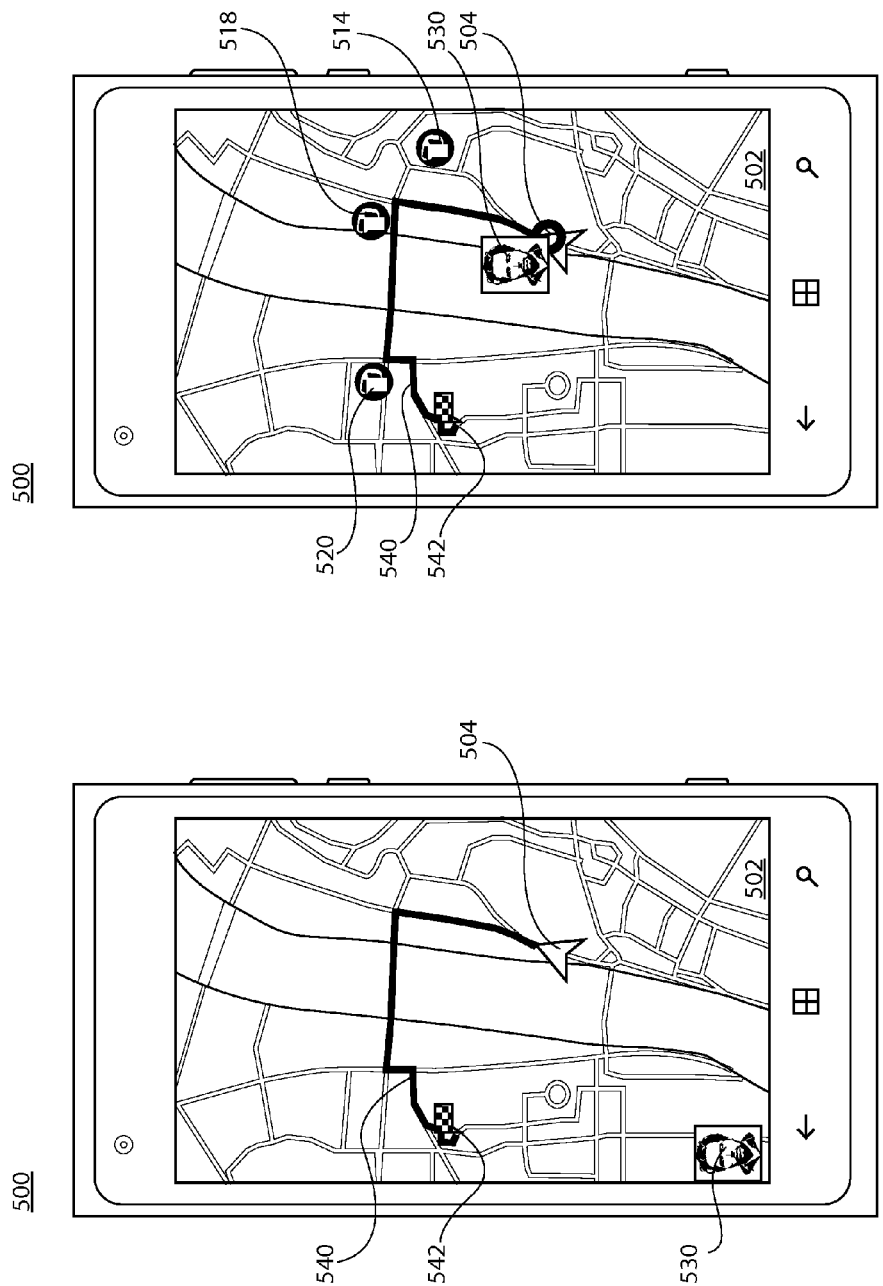

US 9,560,484 B2

PERFORMANCE OF A LOCATION RESPONSE ACTION

TECHNICAL FIELD

The present application relates generally to performance of a location response action based on a selected point of interest.

BACKGROUND

As electronic apparatuses become increasingly prevalent in our society, many users have become increasingly dependent on their electronic apparatus in daily life. For example, a user may desire to communicate a location by way of the user's electronic apparatus. As such, it may be desirable to configure an electronic apparatus such that a user of the electronic apparatus may communicate such a location in an intuitive and simple manner.

SUMMARY

Various aspects of examples of the invention are set out in the claims.

One or more embodiments may provide an apparatus, a computer readable medium, a non-transitory computer readable medium, a computer program product, and/or a method for receiving information indicative of an incoming communication, determining a notification that signifies the incoming communication, causing rendering of the notification, receiving information indicative of a point of interest selection input that identifies a selected point of interest, and causing performance of a location response action associated with the incoming communication, based at least in part, on the selected point of interest.

One or more embodiments may provide an apparatus, a computer readable medium, a computer program product, and/or a non-transitory computer readable medium having means for receiving information indicative of an incoming communication, means for determining a notification that signifies the incoming communication, means for causing rendering of the notification, means for receiving information indicative of a point of interest selection input that identifies a selected point of interest, and means for causing performance of a location response action associated with the incoming communication, based at least in part, on the selected point of interest.

An apparatus comprising at least one processor and at least one memory, the memory comprising machine-readable instructions, that when executed cause the apparatus to perform receipt of information indicative of an incoming communication, determination of a notification that signifies the incoming communication, causation of rendering of the notification, receipt of information indicative of a point of interest selection input that identifies a selected point of interest, and causation of performance of a location response action associated with the incoming communication, based at least in part, on the selected point of interest.

In at least one example embodiment, the notification comprises a visual notification, and causation of rendering of the notification comprises causation of display of the visual notification.

One or more example embodiments further perform identification of a sender of the incoming communication, wherein the visual notification comprises visual information indicative of the sender.

In at least one example embodiment, the notification comprises an audible notification, and causation of rendering of the notification comprises causation of rendering of the audible notification.

In at least one example embodiment, the notification comprises a tactile notification, and causation of rendering of the notification comprises causation of actuation of the tactile notification.

In at least one example embodiment, the incoming communication is at least one of a message, or a call request.

In at least one example embodiment, the message is at least on of an email, an instant message, a social media message, a text message, or a multimedia message.

In at least one example embodiment, the call request is at least one of an audio call request or a video call request.

In at least one example embodiment, the information indicative of the point of interest selection input comprises speech input that identifies the selected point of interest.

One or more example embodiments further perform identification of the selected point of interest from the speech input.

One or more example embodiments further perform determination of an ordered set of point of interest candidates, wherein the point of interest selection input identifies a point of interest candidate from the ordered set of point of interest candidates as the selected point of interest.

One or more example embodiments further perform receipt of information indicative of a location response action selection input, wherein the location response action is based, at least in part, on the location response action selection input.

One or more example embodiments further perform causation of display of a set of location response action candidates, wherein the location response action selection input identifies a location response action candidate from the set of location response action candidates as the location response action.

One or more example embodiments further perform causation of display of map information, wherein the notification comprises a visual notification, and causation of rendering of the notification comprises causation of display of the visual notification such that the visual notification overlays the map information.

In at least one example embodiment, causation of display of the map information is performed prior to receipt of information indicative of the incoming communication.

One or more example embodiments further perform receipt of information indicative of a location response enablement input, wherein causation of display of the map information is based, at least in part, on the location response enablement input.

In at least one example embodiment, the location response enablement input signifies a user directive to utilize a location response action in association with the incoming communication.

One or more example embodiments further perform causation of display of a location response interface element, wherein the location response enablement input corresponds with the location response enablement interface element.

One or more example embodiments further perform determination of a location of the apparatus, wherein causation of display of the visual notification is performed such that a position of the visual notification corresponds with the location of the apparatus with respect to the map information.

One or more example embodiments further perform causation of display of a plurality of point of interest candidates at positions that correspond with the respective locations of the point of interest candidates with respect to the map information.

In at least one example embodiment, the point of interest selection input comprises a drag input that indicates movement of the visual notification to a position that corresponds with a position of a point of interest candidate and the point of interest selection input identifies the point of interest candidate as the selected point of interest based, at least in part, on the correspondence of the position with the point of interest candidate.

In at least one example embodiment, the position of the visual notification corresponds with the point of interest candidate by way of the position of the visual notification being within a snap region associated with the point of interest candidate.

One or more example embodiments further perform determination of a route to a destination location, wherein the point of interest candidates are proximate to the route.

One or more example embodiments further perform determination of the route prior to the receipt of the incoming communication.

One or more example embodiments further perform determination of a different route to the destination location, such that the different route includes the selected point of interest.

One or more example embodiments further perform determination that the drag input indicates the location response action.

In at least one example embodiment, the drag input indicates the location response action by way of a number of contact regions comprised by the drag input.

One or more example embodiments further perform determination of the location of the apparatus.

In at least one example embodiment, the location response action comprises sending a response to the incoming communication such that the response comprises information indicative of the location of the apparatus.

In at least one example embodiment, the response is a message.

One or more example embodiments further perform determination that the location of the apparatus has changed to a different location of the apparatus, wherein the location response action comprises sending another response to the incoming communication such that the other response comprises information indicative of the different location of the apparatus.

In at least one example embodiment, the location response action comprises sending a response to the incoming communication such that the response comprises information indicative of the selected point of interest.

In at least one example embodiment, the location response action comprises sending a response to the incoming communication such that the response comprises information indicative of a transit time between the location of the apparatus and the selected point of interest.

One or more example embodiments further perform determination that the transit time has changed to a different transit time, wherein the location response action comprises sending another response to the incoming communication such that the other response comprises information indicative of the different transit time.

One or more example embodiments further perform determination that the location of the apparatus corresponds with the selected point of interest.

In at least one example embodiment, the location response action comprises actuation of a response reminder notification and causation of performance of the actuation of the response reminder notification is caused by the determination that the location of the apparatus corresponds with the selected point of interest.

In at least one example embodiment, the response reminder notification is indicative of the notification.

In at least one example embodiment, the incoming communication is a call request from a sender, the location response action comprises sending a call request to the sender, and causation of the sending of the call request to the sender is caused by the determination that the location of the apparatus corresponds with the selected point of interest.

One or more example embodiments further perform causation of an actuation of a tactile signal that signifies receipt of the point of interest selection input.

BRIEF DESCRIPTION OF THE DRAWINGS

For a more complete understanding of embodiments of the invention, reference is now made to the following descriptions taken in connection with the accompanying drawings in which:

FIGS. 3A-3B are diagrams illustrating map information according to at least one example embodiment;

FIGS. 4A-4D are diagrams illustrating selecting a point of interest according to at least one example embodiment;

FIGS. 5A-5C are diagrams illustrating selecting a point of interest according to at least one example embodiment;

DETAILED DESCRIPTION OF THE DRAWINGS

Figure 1:
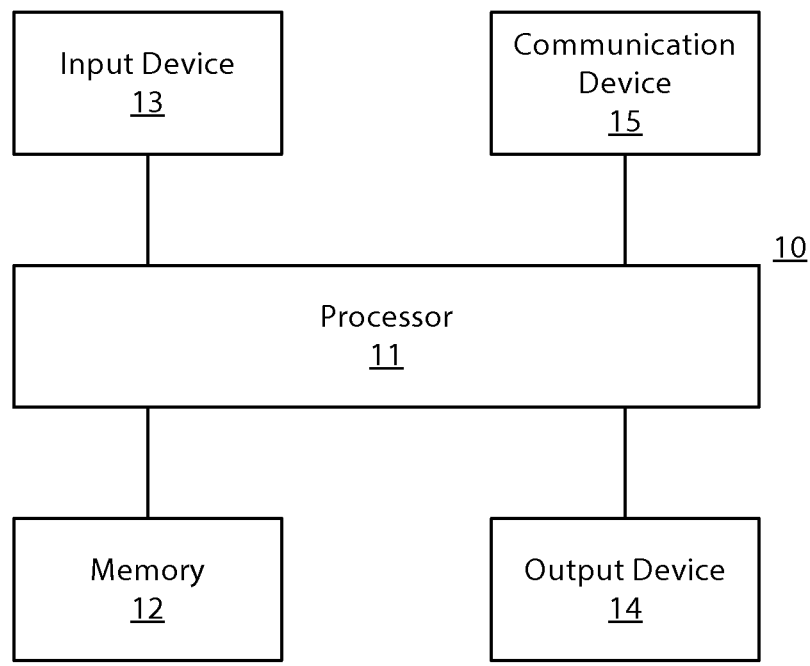
FIG. 1 is a block diagram showing an apparatus according to at least one example embodiment.

An embodiment of the invention and its potential advantages are understood by referring to FIGS. 1 through 12 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content,"

"information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus, and/or the like. For example, the apparatus may send the information to a separate display, to a computer, to a laptop, to a mobile apparatus, and/or the like. For example, the apparatus may be a server that causes display of the information by way of sending the information to a client apparatus that displays the information. In this manner, causation of display of the information may comprise sending one or more messages to the separate apparatus that comprise the information, streaming the information to the separate apparatus, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition, or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display, or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2:
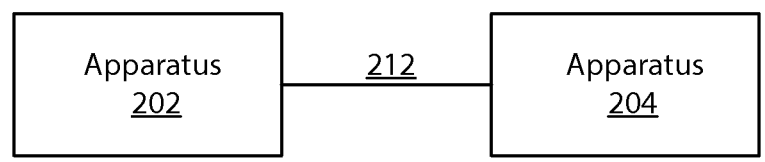
FIG. 2 is a block diagram showing apparatus communication according to at least one example embodiment.

FIG. 2 is a block diagram showing apparatus communication according to at least one example embodiment. The example of FIG. 2 is merely an example and does not limit the scope of the claims. For example, apparatus count may vary, apparatus configuration may vary, communication channels may vary, and/or the like.

In many circumstances, a user may desire to communicate by way of an electronic apparatus. For example, the user may desire to send and receive messages, send and receive audio calls, send and receive video calls, and/or the like. In many circumstances, the user may desire to engage in social interactions by way of the user's electronic apparatus. In order to facilitate such an experience, in many circumstances, it may be desirable to allow for communication between two or more apparatuses. For example, it may be desirable to allow for communication between an apparatus and a separate apparatus. In such an example, each of the apparatus and the separate apparatus may be a phone, a tablet, a computer, a laptop, an electronic apparatus, a server, and/or the like. In at least one example embodiment, an apparatus and a separate apparatus communicate via a direct communication channel, an indirect communication channel, and/or the like. In such an example embodiment, the indirect communication channel may route communication between the apparatus and the separate apparatus by way of one or more routers, switches, hubs, distribution servers, and/or the like. In at least one example embodiment, an apparatus and a separate apparatus communicate via an indirect communication channel by way of a server. In such an example embodiment, the server may be a computer, a service platform, a repository, an application, and/or the like. For example, the server, may be configured to update an account associated with the separate apparatus such that the separate apparatus may receive information from the apparatus by way of accessing the account via the server.

In the example of FIG. 2, apparatus 202 communicates with apparatus 204 by way of communication channel 212. For example, apparatus 202 may send information to apparatus 204 by way of communication channel 212, apparatus 202 may receive information sent from apparatus 204 by way of communication channel 212, and/or the like. It should be understood that, even though the example of FIG. 2 illustrates a direct communication channel between apparatus 202 and apparatus 204, there may be intermediate apparatuses that facilitate communication between apparatus 202 and apparatus 204. For example, there may be one or more routers, hubs, switches, gateways, and/or the like, that are utilized in the communication channels between apparatus 202 and apparatus 204. In addition, there may be other separate apparatuses that apparatus 202 and/or apparatus 204 are in communication with. For example, apparatus 202 and/or apparatus 204 may be in communication with another apparatus, a separate apparatus, a different apparatus, and/or the like.

In some circumstances, a user may desire to have collaboration between apparatuses, such as between an apparatus and a separate apparatus. In some circumstances, a plurality of apparatuses may collaborate by way of local communication among the apparatuses. For example, the apparatuses may collaborate by way of low power radio frequency communication, a radio frequency communication, near field communication, inductive communication, electric field communication, Bluetooth communication, infrared communication, local area network communication, wireless local area network communication, local port communication, input/output port communication, and/or the like. In some circumstances, apparatuses may collaborate by way of non-local communication among the apparatuses. For example, the apparatuses may communicate by way of high power radio frequency communication, wide area network communication, internet communication, cellular network communication, and/or the like. In at least one example embodiment, an apparatus retains information associated with communication with a separate apparatus. For example, the apparatus may comprise information associated with identifying, communicating with, authenticating, performing authentication with, and/or the like, the separate apparatus. In this manner, the apparatus may be privileged to perform operations in conjunction with the separate apparatus that a different apparatus may lack the privilege to perform.

In at least one example embodiment, an apparatus and a separate apparatus communicate by way of communication channels. For example, as depicted in FIG. 2, apparatus 202 communicates with apparatus 204 by way of communication channel 212. In the example of FIG. 2, communication channel 212 may be a local area network communication channel, a wide area network communication channel, an internet communication channel, a cellular communication channel, and/or the like. In at least one example embodiment, the apparatus receives information indicative of an incoming communication. For example, the apparatus may receive a radio transmission, an electrical transmission, a data transmission, and/or the like such that the apparatus is informed that a communication is incoming. An incoming communication may be a message, a call, and/or the like addressed to the apparatus and/or the user of the apparatus. For example, in circumstances where the apparatus is a telephone, the incoming communication may be a telephone call directed to a user associated with the apparatus. In many circumstances, the incoming communication may be associated with a sender of the incoming communication. A sender of the incoming communication may be a different apparatus, a user of a different apparatus, and/or the like. For example, in circumstances where the apparatus is a telephone, the sender may be a different telephone and/or a user of the different telephone. In at least one example embodiment, the incoming communication is a message, a call request, and/or the like. In at least one example embodiment, a message refers to an email, an instant message, a social media message, a text message, a multimedia message, and/or the like. In at least one example embodiment a call request refers to an audio call request, a video call request, and/or the like.

FIGS. 3A-3B are diagrams illustrating map information according to at least one example embodiment. The examples of FIGS. 3A-3B are merely examples and do not limit the scope of the claims. For example, visual information may vary, the points of interest may vary, the location of the apparatus may vary, and/or the like.

In many circumstances, it may be desirable for a person to know his approximate location. For example, the person may desire to know his approximate location so that he can estimate his distance from a different location, inform other persons of his location, and/or the like. In such circumstances, the person may find it desirable to estimate his location by determining the location of the apparatus. In at least on example embodiment, the apparatus determines the location of the apparatus. For example, the apparatus may determine the location of the apparatus by way of a Global Positioning System, a cellular telephone network, radio triangulation, Earth magnetic field based positioning or inertial sensor based positioning, and/or the like. In such circumstances, the apparatus may render an alert that informs the user of the apparatus of the location of the apparatus. In such circumstances, the user may be able to estimate his location based, at least in part, on the location of the apparatus.

Oftentimes when a person knows his approximate location, it may be desirable to perceive the location with respect to the location's surroundings. For instance, a person may desire to know which direction to travel to reach a different location, determine the distance to an unknown location, direct another person from a different location to the person's location, and/or the like. In such circumstances, it may be desirable for the apparatus to display map information to a user of the apparatus. Map information may comprise visual information representative of a location displayed to the user of the apparatus, one or more cartographic details such as roads, one or more geographical features, one or more political boundaries, one or more labels, one or more cardinal directions, one or more scales, and/or the like. For example, map information may comprise a visual representation of a city street layout, with labels for street names, and the borders of the city. In another example, the map information may comprise a floor plan of a large structure, such as an office building, a cruise ship, a stadium, and/or the like. In at least one example embodiment, the apparatus causes display of map information. In at least one example embodiment, map information includes a location indicator that indicates the location of the apparatus. For example, the location indicator may indicate that the location of the apparatus is a particular location, such as a location in a city. In another example, the location indicator may indicate that the location of the apparatus is a relative location, such as a location on a moving cruise ship.

FIGS. 3A-3B illustrate an apparatus 300 which comprises a display. It can be seen that map information 302 is displayed on apparatus 300. Even though map information 302 as illustrated is visual information representative of a particular location, in some circumstances map information 302 may be representative of other locations. It can be seen that map information 302 includes visual representations of roads, geographical features, and cardinal directions. Map information 302 comprises apparatus location indicator 304. Apparatus location indicator 304 represents the current location of the apparatus. Even though apparatus location indicator 304 as illustrated corresponds with a particular location, in some circumstances apparatus location indicator 304 may correspond with other locations. For example, in circumstances where apparatus 300 is moved to a different location, apparatus location indicator 304 may be displayed at a different position with respect to map information 302 that represents the different location.

Often when viewing map information, a person may find it desirable for the map information to comprise points of interest. In at least on example embodiment, map information comprises one or more points of interest. FIG. 3B illustrates map information 302 comprising points of interest 310, 312, 314, 316, 318, 320, 322, and 324. A point of interest may be map information corresponding with a location that the person my find useful or interesting. For example, a point of interest may correspond with a restaurant, a fuel refilling station, a hotel, a tourist attraction, and/or the like. For instance, a user may wish to determine a location of a fuel refilling station near the location of an apparatus. In circumstances such as these, a user of the apparatus may use map information to assist in navigating to the location of a particular point of interest. For example, a user of apparatus 300 may plan a navigation route from the location represented by apparatus location indicator 304 to a location of point of interest 324 based, at least in part, on map information 302.

FIGS. 4A-4D are diagrams illustrating selecting a point of interest according to at least one example embodiment. The examples of FIG. 4D are merely examples and do not limit the scope of the claims. For example, the apparatus may vary, the incoming communication may vary, the notification may vary, representation of information may vary, and/or the like.

Often when receiving an incoming communication, it may be desirable to notify a user of the apparatus of the incoming communication. For example, the user of the apparatus may be focused on other activities, and may be unaware of the incoming communication until receiving a notification from the apparatus. In at least one example embodiment, the apparatus determines a notification that signifies the incoming communication and causes rendering of the notification. Rendering of the notification may refer to causing the notification to be performed such that the user of the apparatus may recognize the notification. For example, the notification may comprise a visual notification, an audible notification, a tactile notification, and/or the like. In circumstances where the notification comprises a visual notification, rendering of the notification may comprise causation of display of the visual notification. In circumstances where the notification comprises an audible notification, rendering of the notification may comprise causation of rendering of the audible notification. In circumstances where the notification comprises a tactile notification, rendering of the notification may comprise causation of actuation of the tactile notification.

FIGS. 4A-4D illustrate an apparatus 400 which comprises a display. It can be seen that map information 402 is displayed on apparatus 400. Even though map information 402 as illustrated is visual information representative of particular locations, in some circumstances map information 402 may be representative of other locations. It can be seen that map information 402 includes visual representations of roads, geographical features, and cardinal directions. Map information 402 comprises apparatus location indicator 404. Apparatus location indicator 404 represents the current location of the apparatus. Even though apparatus location indicator 404 as illustrated corresponds with a particular location, in some circumstances apparatus location indicator 404 may correspond with other locations. For example, in circumstances where apparatus 400 is moved to a different location, apparatus location indicator 404 may be displayed at a different position with respect to map information 402 that represents the different location. It can be seen that visual notification 430 is displayed on apparatus 400. Visual notification 430 may be a visual notification of an incoming communication to apparatus 430.

In at least one example embodiment, causation of rendering of the notification comprises causation of display of the visual notification such that the visual notification overlays the map information. For example, in FIGS. 4A-4D it can be seen that visual notification 430 is overlaid on map information 402. Visual notification 430 may be overlaid at different positions of the map information. For instance, it can be seen in FIG. 4A that visual notification 430 appears at the bottom of map information 402, and in FIG. 4B that visual notification 430 appears near apparatus location indicator 404. In at least one example embodiment, the apparatus determines a location of the apparatus. In such an example, the apparatus may cause display of the visual notification such that a position of the visual notification corresponds with the location of the apparatus with respect to the map information. In at least one example embodiment, the apparatus identifies a sender of the incoming communication. In such an example, the visual notification may comprise visual information indicative of the sender. For example, the visual notification may comprise an image of the sender, a name of the sender, a phone number of the sender, an address of the sender, and/or the like. It can be seen that visual notification 430 comprises an image. The image comprised by visual notification 430 may be an image that represents the sender of the incoming communication.

When receiving an incoming communication on an apparatus, a user of the apparatus may not always be able to respond to the incoming communication immediately. For example, the incoming communication may be a request for a call. In such circumstances, the user of the apparatus may not be able to accept the incoming call request. For example, the user may be traveling down a noisy sidewalk such that the noise may make responding to the incoming call request difficult. For example, were the user to accept the call request, the sender of the incoming communication may not be able to hear the user of the apparatus over the noise. In circumstances such as these, it may be desirable to inform the sender of the incoming communication of an approximation of when the user of the apparatus may be capable of responding to the incoming communication. To facilitate such alerts to the sender of the incoming communication, it may be desirable for the user of the apparatus to interact with the apparatus in a simple and intuitive manner. For example, it may be desirable to inform the sender of the incoming communication of a location the user of the apparatus may travel to from which the user may respond to the incoming communication. For example, the apparatus may cause performance of a location response action. A location response action may be an action that governs a manner in which the user may perform a response associated with the incoming communication in relation to a location. It may be desirable for the user of the apparatus to determine such a location by selecting a point of interest on the apparatus. For example, the user may select a nearby park from a plurality of points of interest presented to the user on the apparatus.

In at least on example embodiment, the apparatus receives information indicative of a point of interest selection input that identifies a selected point of interest. A point of interest selection input may be any input that designates a point of interest as a selected point of interest. For example, a point of interest selection input may be a touch input, a voice input, and/or the like. A selected point of interest may refer to a point of interest selected by the user in which the user intends to respond to the incoming communication. In at least one example embodiment, the information indicative of the point of interest selection input comprises speech input that identifies the selected point of interest. The apparatus may then identify the selected point of interest from the selected speech input. For example, the user may speak a phrase identifying a nearby fuel refilling station as the selected point of interest. The apparatus may then identify that the fuel refilling station is the selected point of interest.

To facilitate the user selecting a point of interest, it may be desirable for the apparatus to present a plurality of points of interest candidates from which the user may select. In at least one example embodiment, the apparatus determines an ordered set of point of interest candidates. An ordered set may be a set of points of interest in a structure that facilitates sequential access, such as a linked list, a table, an array, a database, and/or the like. A point of interest candidate may refer to a point of interest from the ordered set that is available for selection, and has not been selected by the user. For example, the apparatus may determine an ordered set of point of interest candidates based, at least in part, on the location of the apparatus, a history of points of interest visited frequently by the user, and/or the like. In at least one example embodiment, the apparatus causes of display of a plurality of point of interest candidates at positions that correspond with the respective locations of the point of interest candidates with respect to the map information. For example, it can be seen in FIGS. 4B-4D that map information 402 comprises points of interest 410, 412, 414, 416, 418, 420, 422, and 424. Points of interest 410, 412, 414, 416, 418, 420, 422, and 424 are at positions that correspond with their respective locations with respect to map information 402. In some circumstances, points of interest 410, 412, 414, 416, 418, 420, 422, and 424 may be point of interest candidates. For example, an ordered set of points of interest candidates may comprise points of interest 410, 412, 414, 416, 418, 420, 422, and 424. In at least one example embodiment, the point of interest selection input identifies a point of interest candidate from the ordered set of point of interest candidates as the selected point of interest.

A simple and intuitive input for a user to select a point of interest may be a drag input. For instance, the user may find it intuitive to drag the visual notification to a position on the map information corresponding to a point of interest the user wishes to select. In at least one example embodiment, the point of interest selection input comprises a drag input that indicates movement of the visual notification to a position that corresponds with a position of a point of interest candidate. In such an example, the point of interest selection input may identify the point of interest candidate as the selected point of interest based, at least in part, on the correspondence of the position with the point of interest candidate. For example, as illustrated by FIG. 4B, visual notification 430 appears at a position near apparatus location indicator 404. The apparatus may receive information indicative of a drag input that moves visual notification 430 in a manner that visual notification 430 is relocated to its position as illustrated in FIG. 4C, which is near point of interest 418. In circumstances where point of interest 418 is a point of interest candidate, such a drag input may identify point of interest 418 as the selected point of interest. In some circumstances, it may be desirable for the position of the visual notification to correspond with the point of interest candidate by way of a snap region. In at least one example embodiment, snap region is an area surrounding a position of distinct map information such that a notification located at a position within the snap region is associated with the distinct map information. For example, the particular map information may be a point of interest, representative of a road, representative of a sidewalk, and/or the like. In this manner, the snap region may allow the user to select a point of interest with less precise movements. For example, the user may perform a drag input that moves the visual notification to a proximate position to a point of interest. Such a drag input may be considered to be a point of interest selection input in circumstances where the position of the visual notification corresponds with the point of interest candidate by way of a snap region. In at least one example embodiment, the position of the visual notification corresponds with the point of interest candidate by way of the position of the visual notification being within a snap region associated with the point of interest candidate. In at least on example embodiment, the position of the visual notification corresponds with the point of interest candidate by way of the position of the visual notification being within a snap region associated with map information representative of a road. For example, the user may perform a drag input that moves the visual notification to a proximate position to map information representative of a road. The apparatus may then determine a point of interest candidate based, at least in part, on the point of interest candidate's proximity to the map information representative of a road. In circumstances such as these, the apparatus may then display the visual notification at a position near the determined point of interest candidate. In this manner, the user may drag the visual notification towards map information indicative of a road, so that the visual notification snaps to the map information indicative of the road. The user may further drag the visual notification along the road to another snap region that corresponds with a point of interest. In this manner, the snap region associated with the road may assist the user in dragging the visual notification to the snap region associated with the point of interest. In such circumstances, such snap regions may assist the user when the user may be distracted, partially obstructed, and/or the like. For example, the user may be driving, walking, in a shaking vehicle, and/or the like.

In at least one example embodiment, the apparatus causes an actuation of a tactile signal that signifies receipt of the point of interest selection input. A tactile signal may refer to a signal that can be felt by a user of the apparatus. For example, the apparatus may cause a vibration signifying receipt of the point of interest selection input.

As previously described, it may be desirable for the apparatus to cause performance of a location response action associated with the incoming communication, based at least in part on the selected point of interest. In at least one example embodiment, the location response action comprises sending a response to the incoming communication. The response may be a message, a call, and/or the like. In at least one example embodiment, the response is a message. For example, the apparatus may send a text message to the sender of the incoming communication that alerts the sender that the user of the apparatus is unable to respond to the incoming communication at this time. In at least one example embodiment, the response comprises information indicative of the location of the apparatus. For example, in circumstances where the apparatus is apparatus 400, the response may comprise information indicative of the location of apparatus 400.

In some circumstances, it may be desirable to update the sender of the communication as the location of the user changes. For example, it may help the sender of the communication better understand when to expect a response by receiving periodic updates of the user's location. In at least one example embodiment, the apparatus determines that the location of the apparatus has changed to a different location of the apparatus. In such an example, the location response action may comprise sending another response to the incoming communication such that the other response comprises information indicative of the different location of the apparatus. For example, apparatus 400 may determine that the location of the apparatus has changed to a different location. Apparatus 400 may then send a response indicative of the different location so the sender of the incoming communication.

As previously described, a location response action may comprise sending of a response associated with the incoming communication such that the sender of the incoming location is informed of the location that the user of the apparatus intends to respond to the incoming communication. In at least one example embodiment, the location response action comprises sending a response to the incoming communication such that the response comprises information indicative of the selected point of interest. For example, in circumstances where a point of interest selection input designates point of interest 418 as the selected point of interest, the response would indicate to the sender of the incoming communication that the user intends to respond to the incoming communication at the location of point of interest 418. It many circumstances, it may be desirable for the response to comprise information indicative of the transit time between the location of the apparatus and the selected point of interest. A transit time may refer to an approximate time for the user to travel to the selected point of interest from the location of the apparatus. For example, there may be a transit time between the location of the apparatus and the selected point of interest of 15 minutes. In this example, the sender of the incoming communication may expect the user to respond to the incoming communication in about 15 minutes when the location response action comprises information indicative of the 15 minute transit time.

In circumstances where the transit time changes, it may be desirable to update the sender of the incoming communication of this change. For example, the user may have encountered a travel delay such that the user may not respond to the incoming communication as early as initially indicated. In at least one example embodiment, the apparatus determines that the transit time has changed to a different transit time. In such an example, the location response action comprises sending another response to the incoming communication such that the other response comprises information indicative of the different transit time.

When the user reaches the point of interest, it may be desirable that the apparatus remind the user to respond to the incoming communication. For example, the user may have become distracted by another task and forgotten that the incoming communication needs a response. In at least one example embodiment, the apparatus determines that the location of the apparatus corresponds with the selected point of interest. In at least one example embodiment, the location response action comprises actuation of a response reminder notification. In such an example, the causation of performance of the actuation of the response reminder notification may be caused by the determination that the location of the apparatus corresponds with the selected point of interest. A response reminder notification may refer to a visual notification, an audible notification, or a tactile notification, such that the user is alerted to respond to the incoming communication. In some circumstances, the apparatus may respond to the incoming communication automatically. For example the apparatus may cause establishment of a call to the sender of the incoming communication automatically when the apparatus determines that the location of the apparatus corresponds with the selected point of interest. In at least one example embodiment, the incoming communication is a call request from a sender. In such an example, the location response action may comprise sending a call request to the sender. In such an example, causation of the sending of the call request to the sender may be caused by the determination that the location of the apparatus corresponds with the selected point of interest. In some circumstances, the user may miss a notification of an incoming communication. In such circumstances, it may be desirable for the apparatus to send a notification of the incoming communication to another device. For example, the apparatus may send an email to an email address associated with the user.

In many situations, it may be desirable for the user of the apparatus to designate a location response action for the apparatus. For example, the user may wish for the apparatus to perform different location response actions when receiving incoming communications from different senders. For example, if the user doesn't recognize the sender of the communication, the user may wish to avoid performance of a location response action that involves sharing of location information, response time, and/or the like. In a different example, if the user recognizes the sender, the user may desire the location response action to notify the sender of the user's location. In at least one example embodiment, the apparatus receives information indicative of a location response action selection input. In such an example the location response action may be based, at least in part, on the location response action selection input. A location response action selection input may be any input in which the user indicates a desired location response action. For example, the user may provide a touch input, a voice input, and/or the like. In some circumstances, it may be desirable for the apparatus to inform the user what location response actions are available. For example, the user may be unaware of location response actions that the apparatus may perform. In at least one example embodiment, the apparatus causes of display of a set of location response action candidates. A location response candidate may refer to a location response that has not been selected, but which may be available for selection. In at least one example embodiment, the location response action selection input identifies a location response action candidate from the set of location response action candidates as the location response action. In at least one example embodiment, the apparatus determines that a drag input indicates the location response action and that a different drag input indicates a different location response action. In at least one example embodiment, the drag input indicates the location response action by way of a number of contact regions comprised by the drag input. For example, a single finger drag input may indicate a particular location response action, and a multiple finger drag input may indicated a different location response action.

Figure 5C:
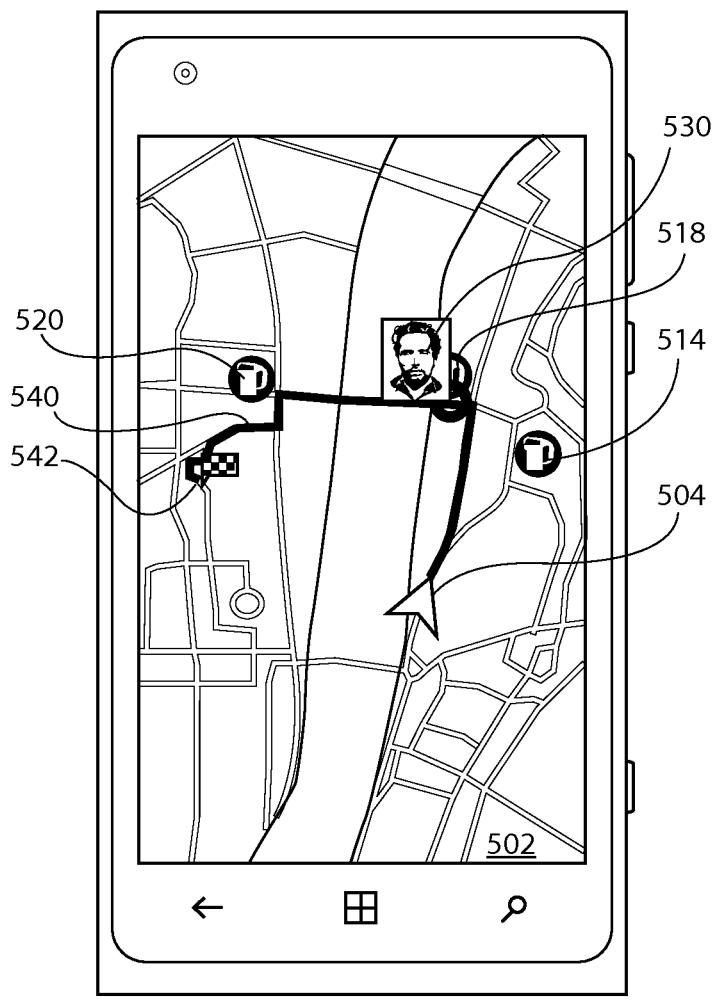

FIGS. 5A-5C are diagrams illustrating selecting a point of interest according to at least one example embodiment. The examples of FIGS. 5A-5C are merely examples and do not limit the scope of the claims. For example, the apparatus may vary, the incoming communication may vary, the notification may vary, and/or the like.

In many circumstances, a user of an apparatus may be using the apparatus to navigate to a destination before the apparatus receives an incoming communication. In circumstances such as these, it may be desirable for the user to avoid immediately responding to the incoming communication. For example, the user may be operating a motor vehicle at the time of the incoming communication. It may be easier for the user to respond to the incoming communication at a later time. In circumstances such as these, it may be desirable to alert the sender of the incoming communication that the user will respond to the incoming communication at a later time. For example, it may be desirable to alert the sender that the user will respond to the incoming communication when he reaches a point of interest. In circumstances such as these, it is desirable that the user can alert the sender of the incoming communication of the user's intent in a simple and intuitive manner.

FIGS. 5A-5C illustrate an apparatus 500 which comprises a display. It can be seen that map information 502 is displayed on apparatus 500. Even though map information 502 as illustrated is visual information representative of a particular location, in some circumstances map information 502 may be representative of other locations. It can be seen that map information 502 includes visual representations of roads, geographical features, and cardinal directions. Map information 502 comprises apparatus location indicator 504. Apparatus location indicator 504 represents the current location of the apparatus. Even though apparatus location indicator 504 as illustrated corresponds with a particular location, in some circumstances apparatus location indicator 504 may correspond with other locations. For example, in circumstances where apparatus 500 is moved to a different location, apparatus location indicator 504 may be displayed at a different position with respect map information 502 that represents the different location. It can be seen that visual notification 530 is displayed on apparatus 500. Visual notification 530 is a visual notification of an incoming communication to apparatus 530. It can be seen that map information 502 includes a route 540 and a destination 542. Route 540 is a route currently being navigated by a user of apparatus 500 such that the user will reach destination 542 from the location represented by apparatus location indicator 504.

In at least one example embodiment, causation of display of the map information is performed prior to receipt of information indicative of the incoming communication. In at least one example embodiment, the apparatus causes display of a plurality of point of interest candidates at positions that correspond with the respective locations of the point of interest candidates with respect to the map information. The point of interest candidates may be selected for display to the user based, at least in part, on the user's currently navigated route. For example, it can be seen in FIGS. 5B-5C that map information 502 comprises points of interest 514, 518, and 520. Points of interest 514, 518, and 520 correspond with their respective locations on map information 502. In some circumstances, points of interest 514, 518, and 520 may be point of interest candidates. For example, it can be seen that points of interest 514-520 correspond with locations near route 540. The apparatus may determine that points of interest 514, 518, and 520 are point of interest candidates, based at least in part, on their vicinity to route 540. In at least on example embodiment, the apparatus determines of a route to a destination location. In such an example, the point of interest candidates may be proximate to the route. In at least one example embodiment, determination of the route is performed prior to the receipt of the incoming communication.

A simple and intuitive input for a user to select a point of interest may be a drag input. For instance, the user may find it intuitive to drag the visual notification to a position on the map information corresponding to a point of interest the user wishes to select. In at least one example embodiment, the point of interest selection input comprises a drag input that indicates movement of the visual notification to a position that corresponds with a position of a point of interest candidate and the point of interest selection input identifies the point of interest candidate as the selected point of interest based, at least in part, on the correspondence of the position with the point of interest candidate. For example, as illustrated by FIG. 5B, visual notification 530 appears at a position near apparatus location indicator 504. The user may enter a drag input that moves visual notification 530 in a manner that visual notification 530 is relocated to its position in FIG. 5C, which is near point of interest 518. In circumstances where point of interest 518 is a point of interest candidate, such a drag input may identify point of interest 518 as the selected point of interest.

In many circumstances, it may be desirable for the apparatus to determine a different route to the destination location. For example, the selected point of interest may be along a different route from the previously determined route. In such circumstances, determining a new route including the selected point of interest may allow the user to respond to the incoming communication more rapidly, more easily, and/or the like. In at least on example embodiment, the apparatus determines a different route to the destination location, such that the different route includes the selected point of interest. For example, apparatus 500 may determine that route 540 fails to guide the user to point of interest 518 when point of interest 518 is the selected point of interest. Apparatus 500 may then determine a different route to destination 542 that includes point of interest 518. In at least one example embodiment, the apparatus determines a route to the selected point of interest. For example, it can be seen that in FIG. 4D, map information 402 comprises a route 408.

In a circumstance where the user has selected point of interest 418, the apparatus may determine route 408 is a route to the selected point of interest from the location represented by apparatus location indicator 404.

Figure 6:
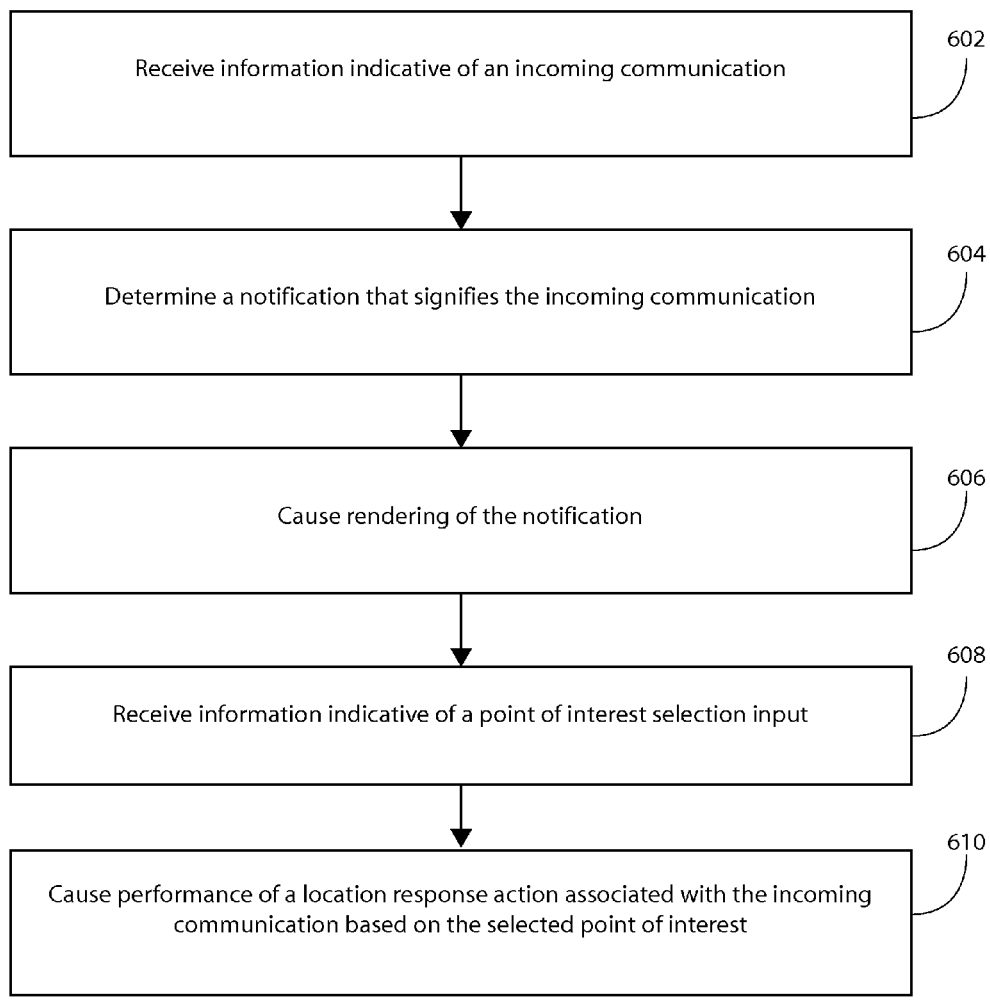
FIG. 6 is a flow diagram illustrating activities associated with performance of a location response action according to at least one example embodiment.

FIG. 6 is a flow diagram illustrating activities associated with performance of a location response action according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

At block 602, the apparatus receives information indicative of an incoming communication. The receipt and the incoming communication may be similar as described regarding FIG. 2.

At block 604, the apparatus determines a notification that signifies the incoming communication. The determination and the notification may be similar as described regarding FIGS. 4A-4D.

At block 606, the apparatus causes rendering of the notification. The rendering may be similar as described regarding FIGS. 4A-4D.

At block 608, the apparatus receives information indicative of a point of interest selection input that identifies a selected point of interest. The receipt, the information, the point of interest selection input, and the selected point of interest may be similar as described regarding FIGS. 3A-3B and FIGS. 4A-4D.

At block 610, the apparatus causes performance of a location response action associated with the incoming communication based, at least in part, on the selected point of interest. The performance and the location response action may be similar as described regarding FIGS. 4A-4D.

Figure 7:
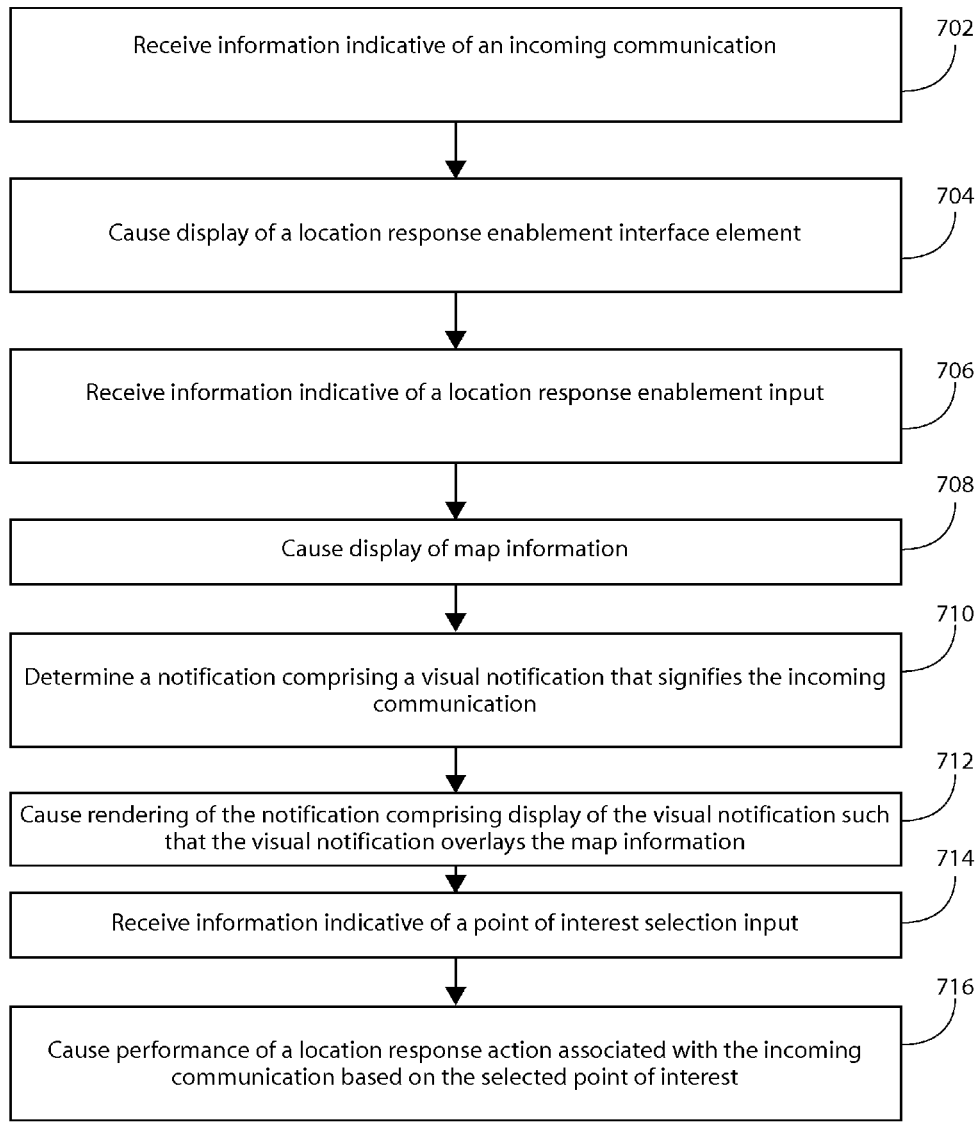
FIG. 7 is a flow diagram illustrating activities associated with causing display of a location response enablement interface according to at least one example embodiment.

FIG. 7 is a flow diagram illustrating activities associated with causing display of a location response enablement interface according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

In some circumstances, it may be desirable for the apparatus to display map information based, at least in part, on a location response enablement input. For example, if the apparatus fails to be causing display of map information when an incoming communication is received, it may be difficult for a user to select an appropriate point of interest. In at least one example embodiment, the apparatus receives information indicative of a location response enablement input. In this manner, causation of display of the map information may be based, at least in part, on the location response enablement input. A location response enablement input may signify a user directive to utilize a location response action in association with the incoming communication. For example, the user may enter a speech input, a touch input, and/or the like. In at least one example embodiment, the apparatus causes of display of a location response interface element. A location response interface element may be an interface element, such as selectable button, a popup, an audio prompt, and/or the like. In at least one example embodiment, the location response enablement input corresponds with the location response enablement interface element. For example, in circumstances where location response enablement input is a voice input, the response enablement interface element may be an audio prompt indicating the apparatus is performing voice recognition. In circumstances where the location response enablement input is a touch input, the response enablement interface element may be a pop up positioned near the touch input.

At block 702, the apparatus receives of information indicative of an incoming communication, similarly as described regarding block 602 of FIG. 6. At block 704, the apparatus causes display of a location response enablement interface element. The display and the location response enablement interface element may be similar as described.

At block 706, the apparatus receives information indicative of a location response enablement input. In this manner, causation of display of the map information is based, at least in part, on the location response enablement input. The receipt and the location response enablement input may be similar as described.

At block 708, the apparatus causes display of map information. In this manner, the causation of display of the map information may be based, at least in part, on the location response enablement input. The display and the map information may be similar as described regarding FIGS. 3A-3B.

At block 710, the apparatus determines a notification comprising a visual notification that signifies the incoming communication. The determination and the notification may be similar as described regarding FIGS. 4A-4D.

At block 712, the apparatus causes rendering of the notification comprising display of the visual notification such that the visual notification overlays the map information. The rendering may be similar as described regarding FIGS. 4A-4D.

At block 714, the apparatus the apparatus receives information indicative of a point of interest selection input that identifies a selected point of interest, similarly as described regarding block 608 of FIG. 6. At block 716, the apparatus causes performance of a location response action associated with the incoming communication based, at least in part, on the selected point of interest, similarly as described regarding block 610 of FIG. 6.

Figure 8:
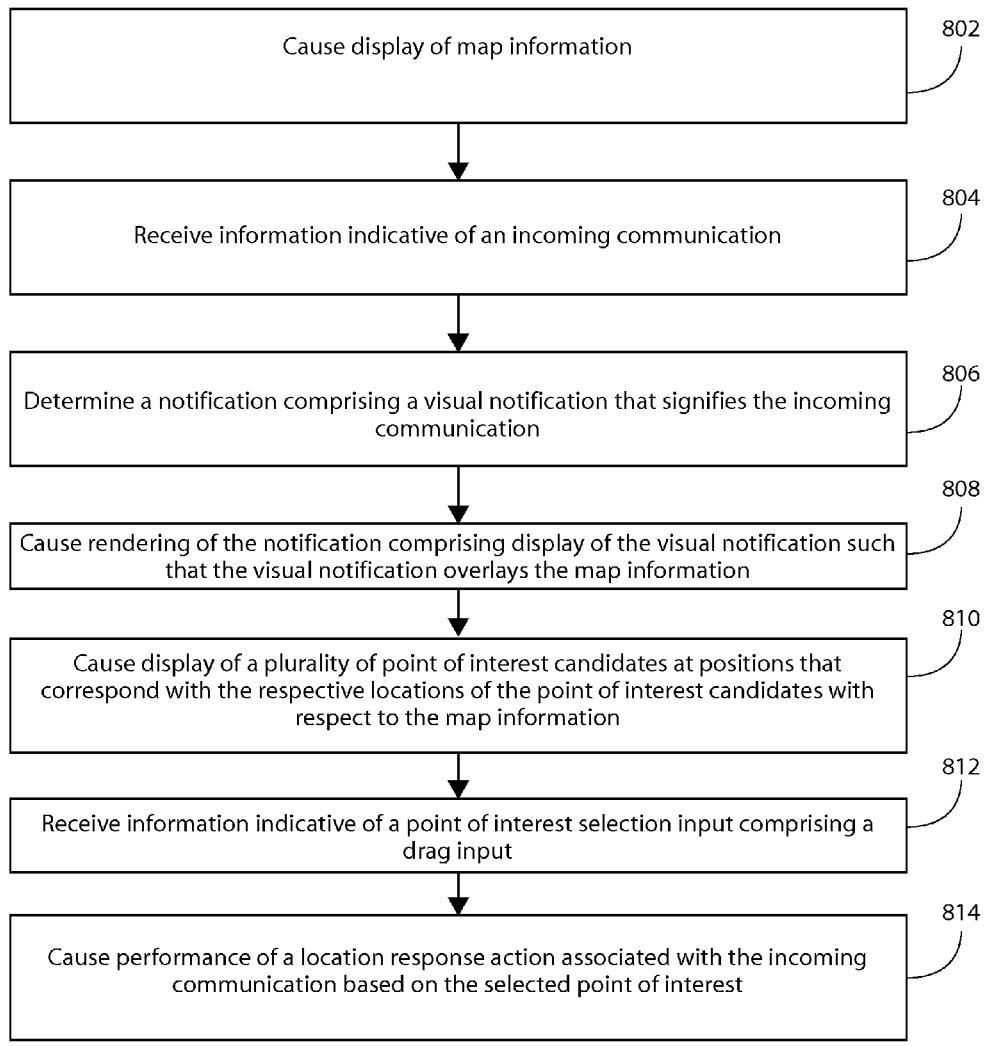
FIG. 8 is a flow diagram illustrating activities associated with display of point of interest candidates according to at least one example embodiment.

FIG. 8 is a flow diagram illustrating activities associated with display of point of interest candidates according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

As discussed previously, in some circumstances it may be desirable for the apparatus to cause display of a plurality of point of interest candidates at positions that correspond with the respective locations of the point of interest candidates with respect to the map information.

At block 802, the apparatus causes display of map information, similarly as described regarding block 708 of FIG. 7. At block 804, the apparatus receives information indicative of an incoming communication, similarly as described regarding block 602 of FIG. 6. At block 806, the apparatus the apparatus determines a notification comprising a visual notification that signifies the incoming communication, similar as described regarding block 710 of FIG. 7. At block 808, the apparatus causes rendering of the notification comprising display of the visual notification such that the visual notification overlays the map information, similar as described regarding block 712 of FIG. 7.

At block 810, the apparatus causes of display of a plurality of point of interest candidates at positions that correspond with the respective locations of the point of interest candidates with respect to the map information. The display, the point of interest candidates, and the positions may be similar as described regarding FIGS. 4A-4D and FIGS. 5A-5C.

At block 812, the apparatus receives information indicative of a point of interest selection input comprising a drag input. The receipt and the point of interest selection input may be similar as described regarding FIGS. 4A-4D and FIGS. 5A-5C.

At block 814, the apparatus causes performance of a location response action associated with the incoming communication based, at least in part, on the selected point of interest, similarly as described regarding block 6010 of FIG. 6.

Figure 9:
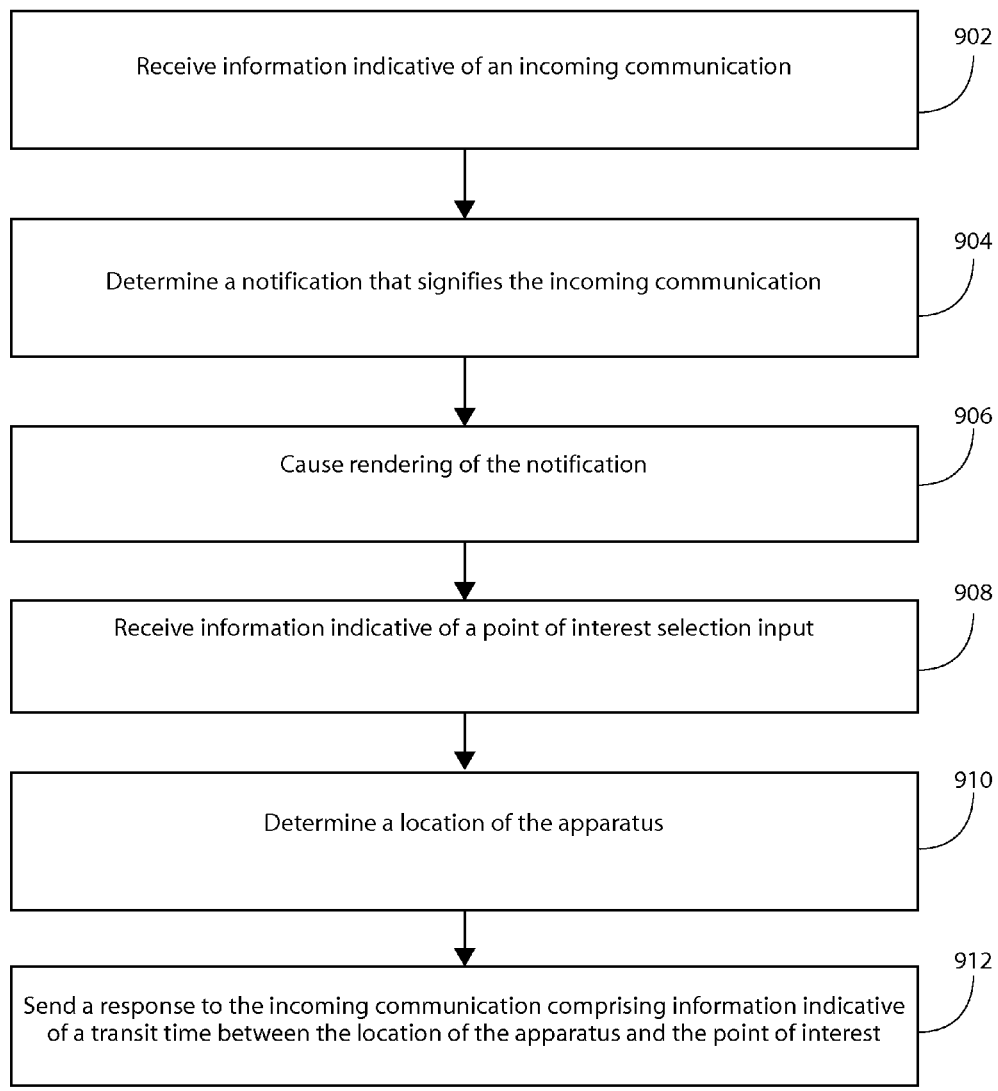
FIG. 9 is a flow diagram illustrating activities associated with sending a response to the incoming communication according to at least one example embodiment.

FIG. 9 is a flow diagram illustrating activities associated with sending a response to the incoming communication according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

As previously described, in some circumstances, it may be desirable for the apparatus to send a response to the incoming communication comprising information indicative of the transit time between the location of the apparatus and the point of interest.

At block 902, the apparatus receives of information indicative of an incoming communication, similarly as described regarding block 602 of FIG. 6. At block 904, the apparatus determines a notification that signifies the incoming communication, similarly as described regarding block 604 of FIG. 6. At block 906, the apparatus causes rendering of the notification, similarly as described regarding block 606 of FIG. 6. At block 908, the apparatus receives information indicative of a point of interest selection input that identifies a selected point of interest, similarly as described regarding block 608 of FIG. 6.

At block 910, the apparatus determines a location of the apparatus. The determination and the location of the apparatus may be similar as described regarding FIGS. 3A-3B and FIGS. 4A-4D.

At block 912, the apparatus sends a response to the incoming communication comprising information indicative of a transit time between the location of the apparatus and the selected point of interest. The sending, the response, and the transit time may be similar as described regarding FIGS. 4A-4D.

Figure 10:
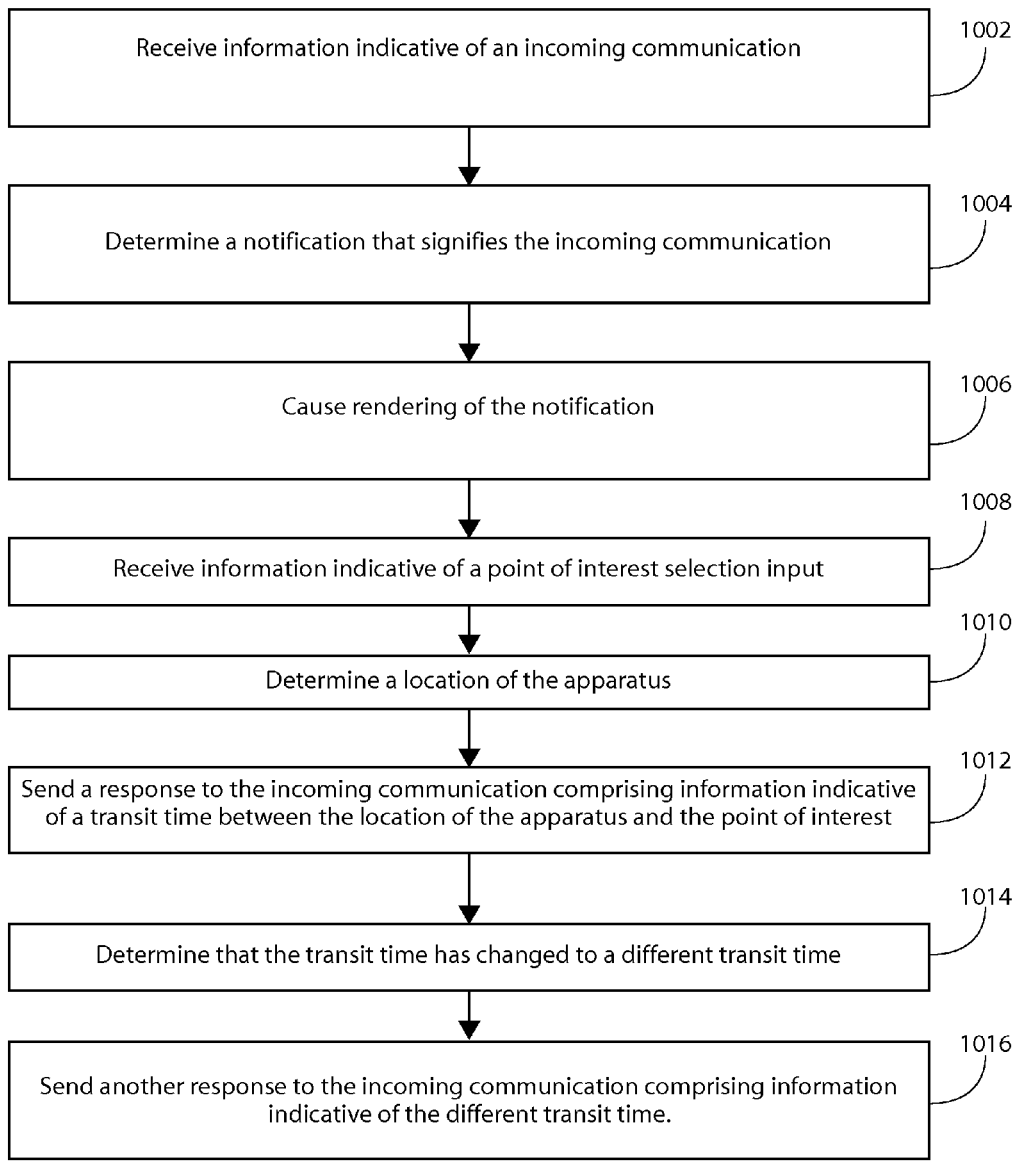
FIG. 10 is a flow diagram illustrating activities associated with sending a response to the incoming communication according to at least one example embodiment.

FIG. 10 is a flow diagram illustrating activities associated with sending a response to the incoming communication according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

As previously described, in some circumstances it may be desirable for the apparatus to send another response to the incoming communication comprising information indicative of the different transit time.

At block 1002, the apparatus receives information indicative of an incoming communication, similarly as described regarding block 602 of FIG. 6. At block 1004, the apparatus determines a notification that signifies the incoming communication, similarly as described regarding block 604 of FIG. 6. At block 1006, the apparatus causes rendering of the notification, similarly as described regarding block 606 of FIG. 6. At block 1008, the apparatus receives information indicative of a point of interest selection input that identifies a selected point of interest, similarly as described regarding block 608 of FIG. 6. At block 1010, the apparatus determines a location of the apparatus, similarly as described regarding block 910 of FIG. 9. At block 1012, the apparatus sends a response to the incoming communication comprising information indicative of a transit time between the location of the apparatus and the selected point of interest, similarly as described regarding block 912 of FIG. 9.

At block 1014, the apparatus determines that the transit time has changed to a different transit time. The determination and the different transit time may be similar as described regarding FIGS. 4A-4D.

At block 1016, the apparatus sends another response to the incoming communication comprising information indicative of the different transit time. The sending and the other transit time may be similar as described regarding FIGS. 4A-4D.

Figure 11:
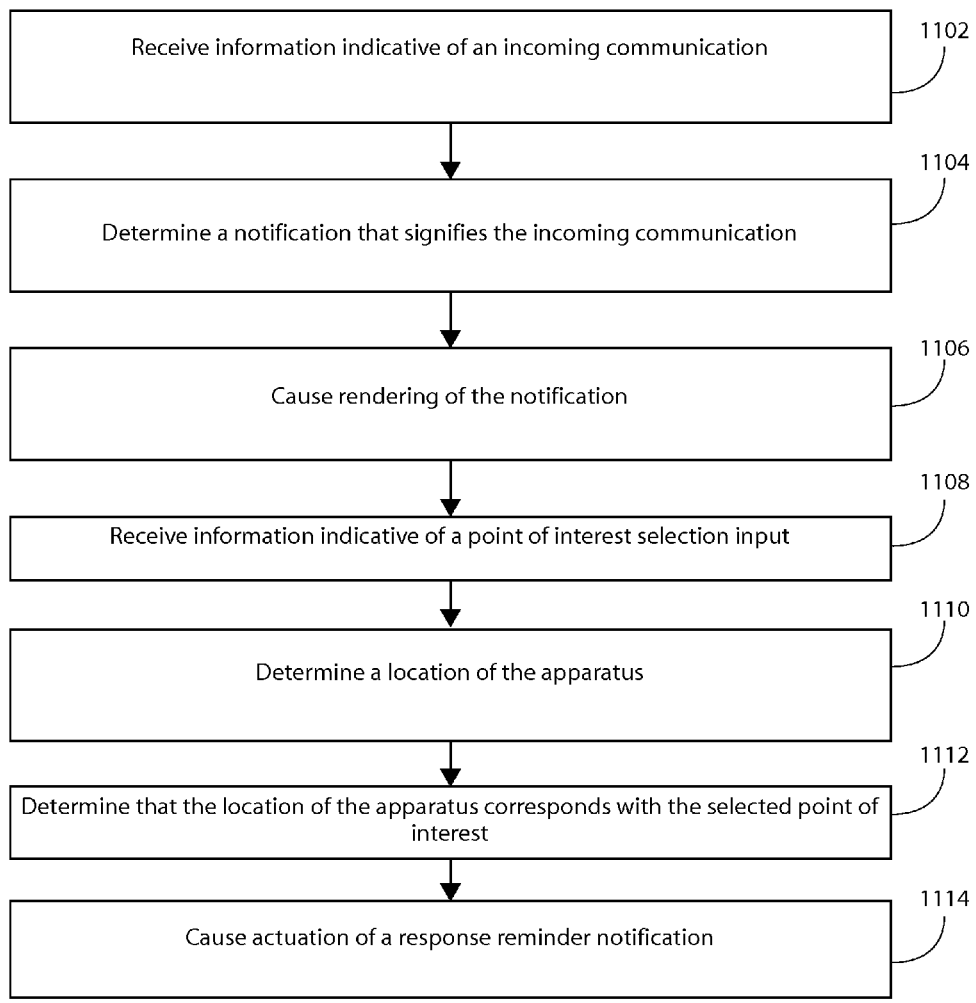
FIG. 11 is a flow diagram illustrating activities associated with actuation of a response reminder notification according to at least one example embodiment.

FIG. 11 is a flow diagram illustrating activities associated with actuation of a response reminder notification according to at least one example embodiment. In at least one example embodiment, there is a set of operations that corresponds with the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

As previously described, in some circumstances it may be desirable for the apparatus to cause actuation of a response reminder notification.

At block 1102, the apparatus receives information indicative of an incoming communication, similarly as described regarding block 602 of FIG. 6. At block 1104, the apparatus determines a notification that signifies the incoming communication, similarly as described regarding block 604 of FIG. 6. At block 1106, the apparatus causes rendering of the notification, similarly as described regarding block 606 of FIG. 6. At block 1108, the apparatus receives information indicative of a point of interest selection input that identifies a selected point of interest, similarly as described regarding block 608 of FIG. 6. At block 1110, the apparatus determines a location of the apparatus, similarly as described regarding block 910 of FIG. 9.

At block 1112, the apparatus determines that the location of the apparatus corresponds with the selected point of interest. The determination may be similar as described regarding FIGS. 4A-4D.

At block 1114, the apparatus causes actuation of a response reminder notification. In this manner, causation of performance of the actuation of the response reminder notification may be caused by the determination that the location of the apparatus corresponds with the selected point of interest. The actuation, and the response reminder notification may be similar as described regarding FIGS. 4A-4D.

Figure 12:
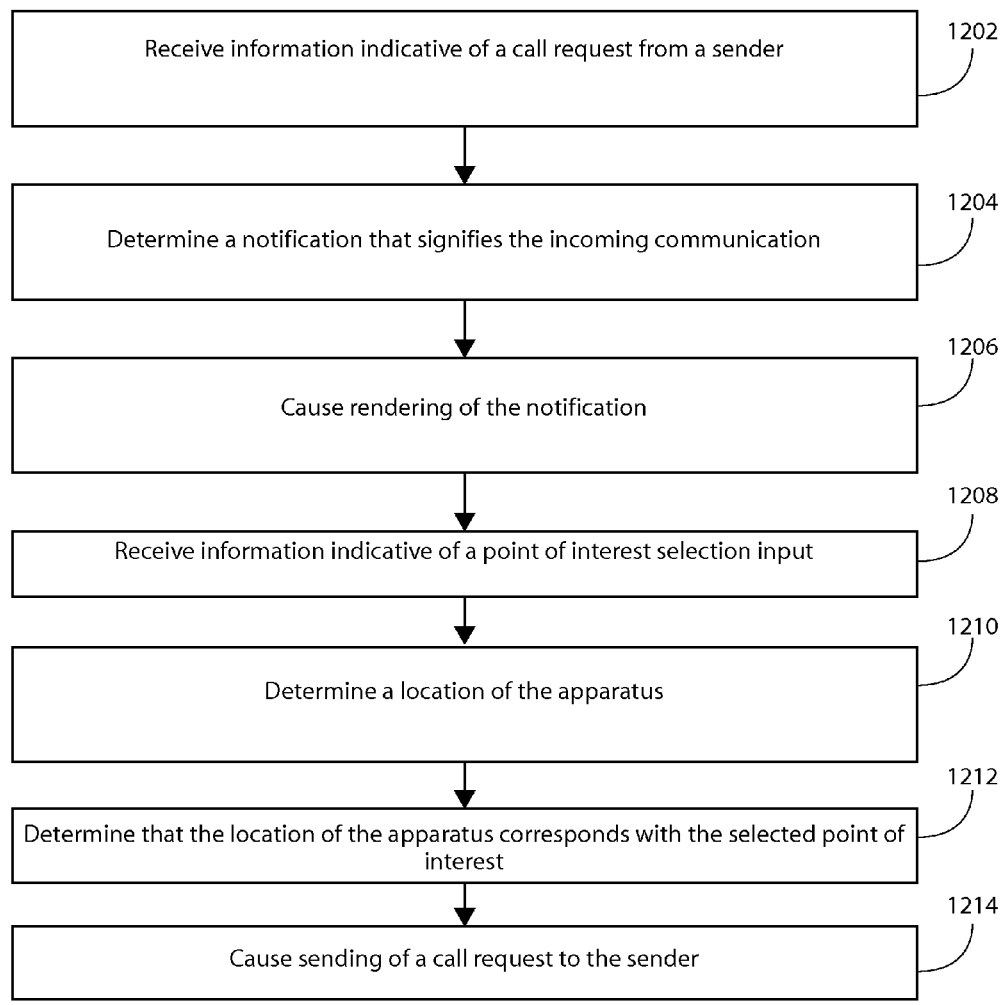
FIG. 12 is a flow diagram illustrating activities associated with sending a call request to the sender according to at least one example embodiment.

FIG. 12 is a flow diagram illustrating activities associated with sending a call request to the sender according to at least one example embodiment. In at least one example embodiment, there is a set of operations that corresponds with the activities of FIG. 12. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 12.

As previously described, in some circumstances it may be desirable for the apparatus to send a call request to the sender.

At block 1202, the apparatus receives information indicative of a call request from a sender. The receipt and the call request may be similar as described regarding FIGS. 4A-4D.

At block 1204, the apparatus determines a notification that signifies the incoming communication, similarly as described regarding block 604 of FIG. 6. At block 1206, the apparatus causes rendering of the notification, similarly as described regarding block 606 of FIG. 6. At block 1208, the apparatus receives information indicative of a point of interest selection input that identifies a selected point of interest, similarly as described regarding block 608 of FIG. 6. At block 1210, the apparatus determines a location of the apparatus, similarly as described regarding block 910 of FIG. 9. At block 1012, the apparatus determines that the location of the apparatus corresponds with the selected point of interest, similarly as described regarding block 1112 of FIG. 11.

At block 1214, the apparatus causes sending of a call request to the sender. In this manner, the sending of the call request to the sender may be caused by the determination that the location of the apparatus corresponds with the selected point of interest. The sending and the call request may be similar as described regarding FIGS. 4A-4D.

Embodiments of the invention may be implemented in software, hardware, application logic or a combination of software, hardware, and application logic. The software, application logic, and/or hardware may reside on the apparatus, a separate device, or a plurality of separate devices. If desired, part of the software, application logic, and/or hardware may reside on the apparatus, part of the software, application logic and/or hardware may reside on a separate device, and part of the software, application logic, and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 702 of FIG. 7 may be performed after block 704 of FIG. 7. Furthermore, if desired, one or more of the above-described functions may be optional or may be combined. For example, block 702 of FIG. 7 may be optional and/or combined with block 704 of FIG. 7.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. A method comprising:
   receiving information indicative of an incoming communication from an other apparatus;
   determining a notification that signifies the incoming communication;
   causing rendering of the notification;
   causing display of map information, wherein the notification comprises a visual notification, and causing rendering of the notification comprises causation of display of the visual notification such that the visual notification overlays the map information;
   receiving information indicative of an input corresponding to the visual notification or the map information; and
   causing performance of an action associated with the incoming communication, wherein the action associated with the incoming communication comprises sending a response to the incoming communication for receipt by the other apparatus based at least in part, on the received information indicative of the input.

2. The method of claim 1, wherein causation of display of the map information is performed prior to receipt of information indicative of the incoming communication.

3. The method of claim 1, further comprising receiving information indicative of an input, for causing display of the map information.

4. The method of claim 3, further comprising causing display of an interface element, wherein the input for causing display of the map information corresponds with the interface element.

5. The method of claim 1, further comprising causing display of a plurality of point of interest candidates at positions that correspond with the respective locations of the point of interest candidates with respect to the map information, wherein the input comprises a drag input that indicates movement of the visual notification to a position that corresponds with a position of a point of interest candidate and the input identifies the point of interest candidate as the selected point of interest based, at least in part, on the correspondence of the position with the point of interest candidate.

6. The method of claim 1, further comprising determining a location of an apparatus.

7. The method of claim 6, wherein the action associated with the incoming communication comprises sending a response to the incoming communication such that the response comprises information indicative of a transit time between the location of the apparatus and a selected point of interest.

8. The method of claim 7, further comprising determining the transit time has changed to a different transit time, wherein the action associated with the incoming communication comprises sending another response to the incoming communication such that the other response comprises information indicative of the different transit time.

9. The method of claim 6, further comprising determining the location of the apparatus corresponds with a selected point of interest.

10. The method of claim 6, wherein the action associated with the incoming communication comprises actuation of a response reminder notification and causation of performance of the actuation of the response reminder notification is caused by the determination that the location of the apparatus corresponds with a selected point of interest.

11. The method of claim 6, wherein the incoming communication is a call request from a sender, the action associated with the incoming communication comprises sending a call request to the sender, and causation of the sending of the call request to the sender is caused by the determination that the location of the apparatus corresponds with a selected point of interest.

12. A computer program product comprising at least one non-transitory computer readable storage medium having computer program code instructions stored therein, the computer program code instructions comprising program code instructions to:
    receive information indicative of an incoming communication from an other apparatus;
    determine a notification that signifies the incoming communication;
    cause rendering of the notification;
    cause display of map information, wherein the notification comprises a visual notification, and causing rendering of the notification comprises causation of display of the visual notification such that the visual notification overlays the map information;
    receive information indicative of an input corresponding to the visual notification or the map information; and
    cause performance of an action associated with the incoming communication, wherein the action associated with the incoming communication comprises sending a response to the incoming communication for receipt by the other apparatus based at least in part, on the received information indicative of the input.

\* \* \* \* \*